(12) United States Patent
Sufleta et al.

(10) Patent No.: US 6,754,431 B2
(45) Date of Patent: Jun. 22, 2004

(54) VARIABLE OPTICAL ATTENUATOR

(75) Inventors: Zbigniew Sufleta, San Jose, CA (US); Janusz Bryzek, Fremont, CA (US); Alex Harwit, San Mateo, CA (US); James Higgins Smith, Campbell, CA (US); Cheng-Chung Huang, Sunnyvale, CA (US); Dmitry Vasily Bakin, San Jose, CA (US); Steven Saeed Nasiri, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/999,838

(22) Filed: Oct. 24, 2001

(65) Prior Publication Data

US 2003/0161604 A1 Aug. 28, 2003

(51) Int. Cl.[7] .................................................. G02B 6/26
(52) U.S. Cl. .......................................... 385/140; 385/15
(58) Field of Search .............................. 385/15, 17, 18, 385/27, 39, 47, 48, 140

(56) References Cited

U.S. PATENT DOCUMENTS

| | | | |
|---|---|---|---|
| 5,864,643 A | | 1/1999 | Pan |
| 6,130,984 A | | 10/2000 | Shen et al. |
| 6,222,954 B1 | * | 4/2001 | Riza ............................. 385/18 |
| 6,374,032 B1 | * | 4/2002 | Mao et al. .................. 385/140 |
| 6,483,962 B1 | * | 11/2002 | Novotny ....................... 385/18 |
| 6,522,801 B1 | * | 2/2003 | Aksyuk et al. ............... 385/18 |
| 6,618,184 B2 | * | 9/2003 | Jin et al. ..................... 359/291 |
| 2002/0114566 A1 | * | 8/2002 | Fairchild et al. .............. 385/33 |
| 2003/0007148 A1 | * | 1/2003 | Moon et al. ................. 356/328 |
| 2003/0012509 A1 | * | 1/2003 | Chang et al. .................. 385/50 |
| 2003/0026582 A1 | * | 2/2003 | IN' T Hout et al. ........ 385/140 |

* cited by examiner

*Primary Examiner*—John D. Lee
(74) *Attorney, Agent, or Firm*—Blakely, Sokoloff, Taylor & Zafman LLP (57) ABSTRACT

A method of controllably attenuating a beam of light coupled into a port includes directing the beam of light against a mirror, and controlling an orientation of the mirror such that a predetermined fraction of the beam of light is coupled into the port. The predetermined fraction is less than a maximum fraction corresponding to optimal coupling of the beam of light into the port. The method may be implemented with a variable optical attenuator including a first port, a second port, a mirror located to direct light output by the first port to the second port, and a controller coupled to the mirror to align it such that the predetermined fraction of light is coupled into the second port. The method may also be implemented with an optical switch.

9 Claims, 5 Drawing Sheets

VARIABLE OPTICAL ATTENUATOR

CROSS REFERENCE TO RELATED APPLICATIONS

This application is related to the following U.S. patent applications: Ser. No. 09/779,189 entitled "A Microelectromechanical Mirror," filed Feb. 7, 2001, all of which are assigned to the assignee of the present invention and incorporated herein by reference in their entirety.

BACKGROUND OF THE INVENTION

1. Field of the Invention

The present invention relates to optical fiber cross-connect switching. More particularly, it relates to load balancing in Dense Wavelength Division Multiplexing optical cross-connect systems.

2. Description of the Related Art

Associated with the information revolution is a need to increase by many orders of magnitude the rate of information transfer. This can be accomplished with optical fibers and the method of Dense Wavelength Division Multiplexing (DWDM), in which many wavelength channels, each including a different narrow band of wavelengths of light and each carrying different information, are multiplexed onto a single optical fiber using an optical multiplexer. Optical signals carried on the various wavelength channels may be separated at the output of the optical fiber with an optical demultiplexer.

Optical fiber cross-connect switches may be used to direct the optical signals on some or all of the wavelength channels on a particular optical fiber to other optical fibers. Such optical fiber cross-connect switches include those described in Ser No. 09/999,878, U.S. patent application Ser. No. 09/999,610, and U.S. patent application Ser. No. 10/002,310, all of which are incorporated herein by reference in their entirety. Hence, optical signals on the various wavelength channels on an optical fiber may have originated at separate locations and traveled different distances in optical fiber. Since light is attenuated during transmission through optical fiber by an amount typically proportional to the distance traveled in optical fiber, the various wavelength channels on an optical fiber may carry different power levels.

Optical amplifiers such as Erbium Doped Fiber Amplifiers (EDFA) can amplify a wide wavelength band (spanning many wavelength channels), and thus compensate for transmission losses in optical fibers. If the power levels on the various wavelength channels carried by the optical fiber are not nearly equal at the input to the optical amplifier, however, the wavelength channel or channels of highest power may saturate the gain. Under such circumstances, the lower power wavelength channels might not be sufficiently amplified.

A variable optical attenuator is an optical device with which the amplitude or power level of an input optical signal may be attenuated by a variable amount to provide an output optical signal of a desired amplitude or power level. The power levels of the various wavelength channels on an optical fiber may be substantially equalized in a "load balancing" or "load equalization" process in which each wavelength channel is routed through a separate variable optical attenuator. Variable optical attenuators are described, for example, in U.S. Pat. Nos. 5,864,643 and 6,130,984. These devices require the insertion of additional hardware into an optical network. The additional hardware may be expensive, requires additional physical space, and may introduce unwanted attenuation of the optical signals.

It would be desirable to incorporate the function of a variable optical attenuator into an optical network without the insertion of additional optical elements.

SUMMARY

A method of controllably attenuating a beam of light coupled into a port in accordance with an embodiment of the present invention includes directing the beam of light against a mirror, and controlling an orientation of the mirror such that a predetermined fraction of the beam of light is coupled into the port. The predetermined fraction is less than a maximum fraction corresponding to optimal coupling of the beam of light into the port. In one embodiment, this method is implemented with a variable optical attenuator including a first port, a second port, a mirror located to direct light output by the first port to the second port, and a controller coupled to the mirror to align it such that the predetermined fraction of light is coupled into the second port. The ports may be or include optical fibers.

In one implementation, the variable optical attenuator includes a second mirror located to direct to the second port light output by the first port and reflected by the first mirror. The controller is also coupled to the second mirror to align it such that the predetermined fraction of light is coupled into the second port. Use of two controllable mirrors in the optical path of the light beam allows independent control of the position and angle of incidence of the light beam on the second port.

Control of the mirror or mirrors in the variable optical attenuator may be accomplished by numerous methods. In one implementation, the power of light coupled into the second port is measured, and an orientation of a mirror is controlled to maintain the power at a predetermined level. In another implementation, an orientation of a mirror corresponding to the predetermined fraction described above is selected from a look-up table. In another implementation, an alignment beam of light is directed against a mirror, and the orientation of the mirror is controlled to direct the alignment beam to a predetermined position on a position sensing detector. The predetermined position corresponds to the predetermined fraction described above.

In another embodiment, a variable optical attenuator includes a first plurality of ports, a second plurality of ports, a first plurality of mirrors disposed on a first surface, a second plurality of mirrors disposed on a second surface, and a controller coupled to align each of the first plurality of mirrors and each of the second plurality of mirrors such that predetermined fractions of light output by the first plurality of ports are coupled into separate ones of the second plurality of ports. The predetermined fractions are less than maximum fractions corresponding to optimal coupling of light output by the first plurality of ports into the second plurality of ports. This embodiment may be employed, for example, to load balance DWDM wavelength channels.

A method of equalizing the power levels of (load balancing) a plurality of channels multiplexed on an optical fiber in accordance with an embodiment of the present invention includes demultiplexing the channels from the optical fiber to form a plurality of beams of light, with each beam of light formed from a separate channel, measuring the power level of each channel, directing each of the beams of light against a separate one of a plurality of mirrors, and controlling an orientation of one of the mirrors such that a predetermined fraction of the beam of light directed against that mirror is coupled into a port. The predetermined fraction is less than a maximum fraction corresponding to optimal coupling of the beam of light into the port.

Variable optical attenuators in accordance with embodiments of the present invention may be implemented in optical cross-connect switches. In such embodiments, the ports and mirrors of the variable optical attenuator may also support switching functions in the optical cross-connect switch. Optical cross-connect switches are typically designed and operated to achieve minimum insertion loss for all optical signals coupled into the switch. The inventors have recognized, however, that variable attenuation can be accomplished by separately controlling the insertion loss for the various optical signals by controllably misaligning mirrors used to switch the optical signals. Hence, the function of one or more variable optical attenuators may be advantageously integrated into an optical network without the insertion of additional optical elements.

BRIEF DESCRIPTION OF THE DRAWINGS

Like reference numbers in the various figures denote same parts in the various embodiments. Dimensions in the figures are not necessarily to scale.

DETAILED DESCRIPTION

A variable optical attenuator in accordance with embodiments of the present invention variably attenuates light coupled into an optical fiber by controlled misalignment of one or more mirrors directing the light to the fiber. A number of embodiments will be described in which one or more optical signals are variably attenuated, and in which controlled misalignment of one or more mirrors is accomplished using, for example, measurements of the power of the attenuated optical signals or measurements of the position of control light beams separate from the optical signals to be attenuated.

Figure 1:
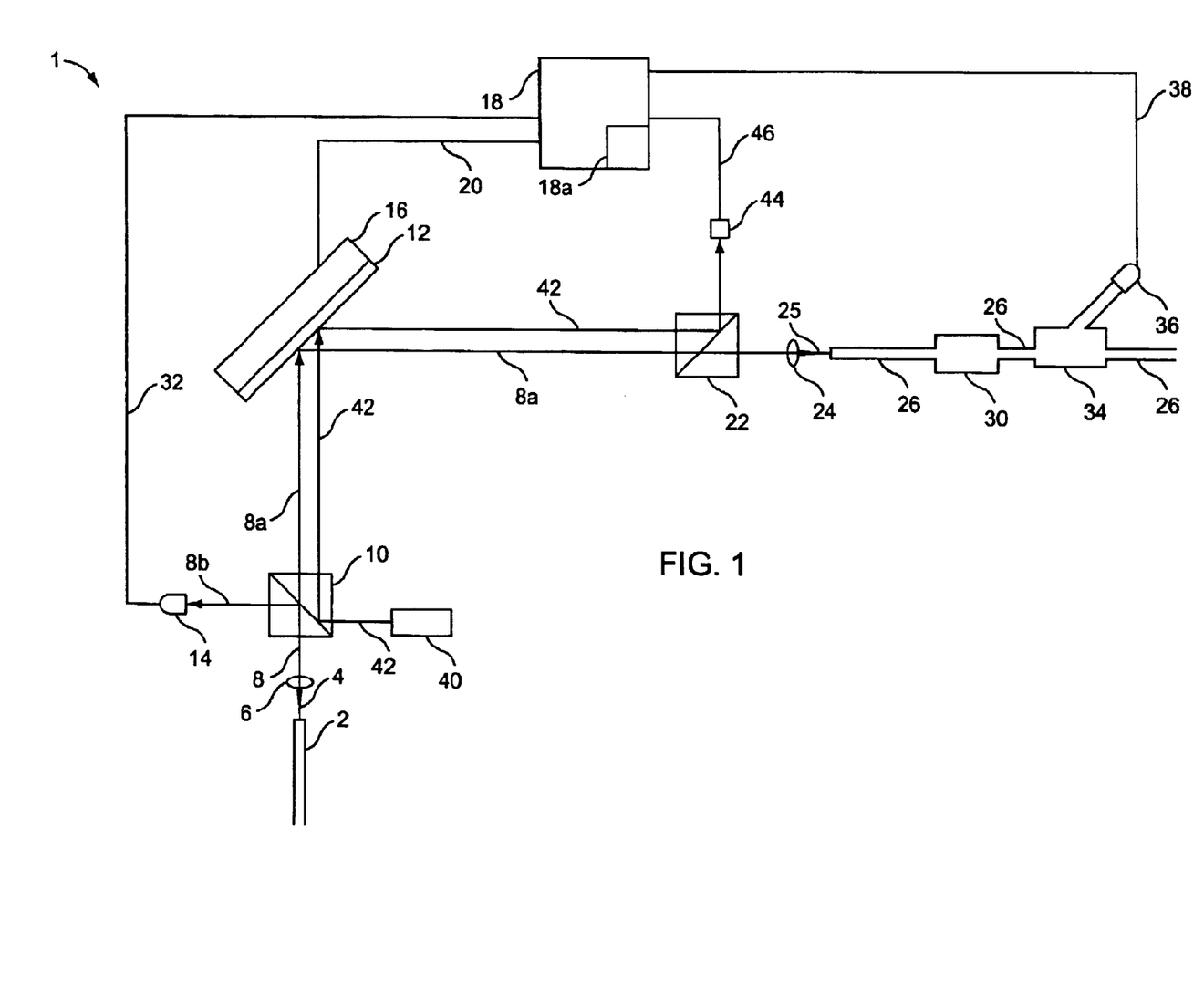
FIG. 1 illustrates schematically a variable optical attenuator in accordance with an embodiment of the present invention.

Referring to FIG. 1, optical fiber 2 carries light to be attenuated by a controlled amount in a variable optical attenuator 1 in accordance with an embodiment of the present invention. As is conventional in DWDM, optical fiber 2 may carry light having a plurality of wavelengths. In one implementation, the light carried by optical fiber 2 has wavelengths near about 1310 nanometers (nm) or about 1550 nm. Optical fiber 2 is, for example, a conventional Corning, Incorporated SMF-28 single mode optical fiber having a core diameter of about 8 microns ($\mu$m) and a cladding diameter of about 125 $\mu$m. Other optical fibers suitable for optical communications applications may also be used.

Optical fiber 2 outputs a diverging cone of light which is, for example, collimated or weakly focused by lens 6 to form light beam 8. Lens 6 is, for example, a conventional plano-convex lens formed from BK 7 optical glass and having a focal length of about 4 millimeters (mm). Light beam 8 is incident on beam splitter 10, which divides light beam 8 into light beam 8a incident on mirror 12 and light beam 8b incident on photodetector 14. Photodetector 14 is, for example, a conventional InGaAs photodiode. Suitable InGaAs photodiodes are available from, for example, Hamamatsu Corporation of Bridgewater, N.J. and Telcom Devices Corporation of Camarillo, Calif.

In one implementation, beam splitter 10 is a cube beam splitter formed from BK 7 optical glass and having a dielectric coating with a reflectivity of about 2% at infrared wavelengths of about 1200 nm to about 1700 mn. In another implementation, beam splitter 10 is a dichroic cube beam splitter formed from BK 7 optical glass and having a dielectric coating with a reflectivity of about 2% at infrared wavelengths of about 1200 nm to about 1700 nm and a reflectivity of about 40% to about 60%, preferably about 50%, at wavelengths of about 600 nm to about 850 nm. Such beam splitters are available, for example, from Harold Johnson Optical Laboratories, Inc. of Gardena, Calif. Suitable coatings for the beam splitter may be obtained, for example, from ZC&R Coatings For Optics, Inc. of Torrance, Calif.

The reflectivity of such a dichroic beam splitter may be selected, for example, to allow at least partial separation of wavelengths of light used in telecommunications (e.g., 1200 nm–1700 nm) from another range (e.g., 600 nm–850 nm) of non-telecommunication wavelengths used for control light beams used in some embodiments as described below.

Referring again to FIG. 1, mirror 12 directs light beam 8a, incident from beam splitter 10, through (optional) beam splitter 22, if it is present, to lens 24. In some implementations, lens 6 focuses light beam 8a to a waist at a location along light beam 8a between lens 6 and lens 24. Such focusing can maintain a relatively small diameter of light beam 8a throughout variable optical attenuator 1 and thus reduce uncontrolled optical loss from, e.g., diffraction.

Mirror 12 is coupled to actuator 16, which is controlled by control system 18 with electrical signals provided via electrical line 20 to orient mirror 12 in a range of arbitrary directions (d$\theta$,d$\phi$). This range of orientations allows mirror 12 to direct light beam 8a onto lens 24 at a range of controlled angles with respect to optical axis 28 (FIGS. 2A–2C) of lens 24 and to a range of controlled positions on surface 25 of lens 24.

In one implementation, mirror 12 and actuator 16 are, respectively, a micro-electro-mechanical systems (MEMS) micro mirror and a MEMS actuator as described, for example, in U.S. patent application Ser. No. 09/779,189 incorporated herein by reference in its entirety. Other micro mirrors may also be used. In such an implementation, mirror 12 may be a freely rotatable MEMS micro mirror actuated by, for example, electrostatic, electromagnetic, piezoelectric, or thermal actuation means. Mirror 12 may be, for example, approximately elliptical with major and minor diameters of about 1.0 mm and about 0.9 mm, respectively. Control system 18 may be, for example, a control system for a MEMS based optical switch such as, for example, control systems disclosed in U.S. patent application Ser. No. 09/999,705 and U.S. patent application Ser. No. 10/003,659, both of which are incorporated herein by reference in their entirety.

In other implementations, mirror 12 may be a conventional mirror having a metal or dielectric coating highly reflective at wavelengths of about 1200 nm to about 1700 nm. Actuator 16 may be a conventional mirror mount actuated by, for example, conventional stepper motors or conventional piezoelectric actuators. Control system 18 may include, for example, a microprocessor and a conventional stepper motor driver or a conventional piezoelectric driver.

Figure 2A:
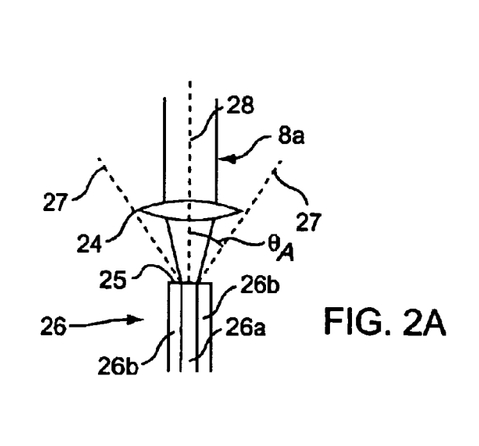
FIG. 2 illustrates schematically a portion of a variable optical attenuator in accordance with the embodiment of FIG. 1.
Figure 2B:
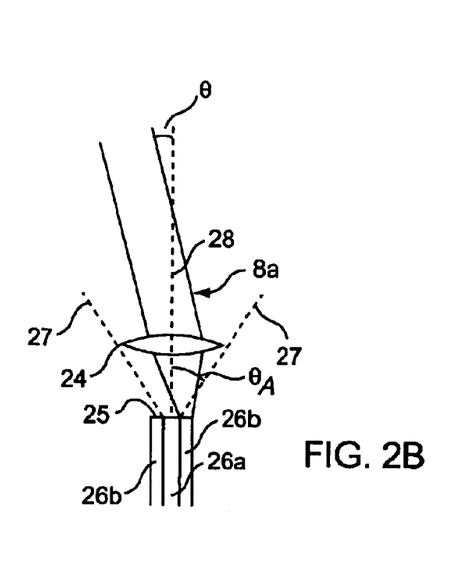
Figure 2C:
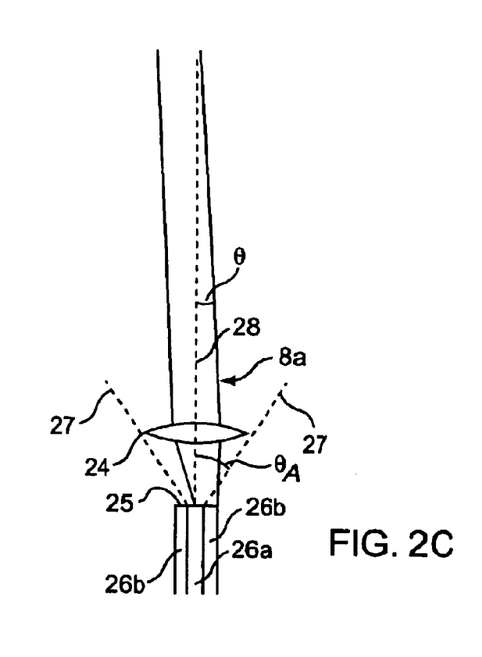

Lens 24 focuses light beam 8$a$, incident from mirror 12, onto optical fiber 26. In one implementation, for example, surface 25 of optical fiber 26 is approximately at the focal plane of lens 24. Referring to FIGS. 2A–2C, lens 24 is positioned with its optical axis 28 approximately centered on the core 26$a$ of optical fiber 26. Lens 24 may be, for example, a conventional plano-convex lens formed from BK 7 optical glass and having a focal length of about 4 mm. Optical fiber 26 includes cladding 26$b$ surrounding core 26$a$.

One of ordinary skill in the art will recognize that lens 24 may couple light beam 8$a$ into a core (e.g., fundamental) optical mode of optical fiber 26 and/or into a cladding mode of optical fiber 26. The power distribution of light in a core mode of optical fiber 26 is concentrated in core 26$a$, although a portion of the power distribution of such a core mode propagates in cladding 26$b$. Light coupled into a core mode can propagate long distances with little attenuation. In contrast, the power distribution of a cladding mode of optical fiber 26 is concentrated in cladding 26$b$.

Only that portion of light beam 8$a$ incident on core 26$a$ of optical fiber 26 at angles with respect to optical axis 28 less than the acceptance angle (determined by the refractive indices of core 26$a$ and cladding 26$b$) of optical fiber 26 will be efficiently coupled into a core mode of optical fiber 26. Hence, the fraction of light beam 8$a$ coupled into a core mode of optical fiber 26 depends on the location at which light beam 8$a$ is incident on lens 24 and the angle that light beam 8$a$ makes with respect to optical axis 28. In FIG. 2A, for example, light beam 8$a$ is incident on the approximate center of lens 24 approximately parallel to optical axis 28 and focused entirely onto core 26$a$ within the acceptance angle $\theta_A$ indicated by dashed lines 27. Thus, light beam 8$a$ is approximately aligned for maximum coupling into a core mode of optical fiber 26. The acceptance angle of optical fiber 26 in air may be, for example, about 7.5° (numerical aperture of about 0.13). One of ordinary skill in the art will recognize that the maximum optical power coupled into a core mode of optical fiber 26 is typically less than the total optical power of light beam 8$a$ as a result of, for example, Fresnel reflection losses at surface 25.

In contrast, in FIG. 2B, light beam 8$a$ is incident on lens 24 at an angle $\theta$ with respect to optical axis 28 sufficiently large that light beam 8$a$ misses core 26$a$ and is focused entirely onto cladding 26$b$. Hence, little or none of light beam 8$a$ is coupled into a core mode of optical fiber 26. Light coupled into a cladding mode of optical fiber 26 is subsequently removed, for example, by a conventional cladding mode stripper 30 (FIG. 1). One of ordinary skill in the art will recognize that light coupled into cladding modes of an optical fiber is typically rapidly attenuated during transmission, particularly if the optical fiber is coiled or otherwise bent. Thus, in other implementations cladding mode stripper 30 is not used. Since light coupled into a cladding mode of optical fiber 26 is subsequently removed or otherwise attenuated, light described herein as being coupled into optical fiber 26 refers to light coupled into a core mode of optical fiber 26 rather than into, for example, a cladding mode of optical fiber 26.

FIGS. 2A and 2B show alignments of light beam 8$a$ resulting in, respectively, approximately minimum attenuation and approximately maximum attenuation of the light coupled into optical fiber 26. Control system 18 may control the orientation of mirror 12 to achieve alignments of light beam 8$a$ intermediate between those of FIGS. 2A and 2B, and thus vary the attenuation of the light coupled into optical fiber 26 between the approximate minimum and approximate maximum levels of attenuation. In FIG. 2C, for example, light beam 8$a$ is incident on lens 24 at an angle $\theta$ with respect to optical axis 28 smaller than that of FIG. 2B and focused to overlap both core 26$a$ and cladding 26$b$ of optical fiber 26. A fraction of light beam 8$a$ focused onto surface 25 at angles less than the acceptance angle of optical fiber 26 will be coupled into a core mode of optical fiber 26. Another fraction of light beam 8$a$ may be coupled into a cladding mode of optical fiber 26 and subsequently removed as described above.

Figure 5:
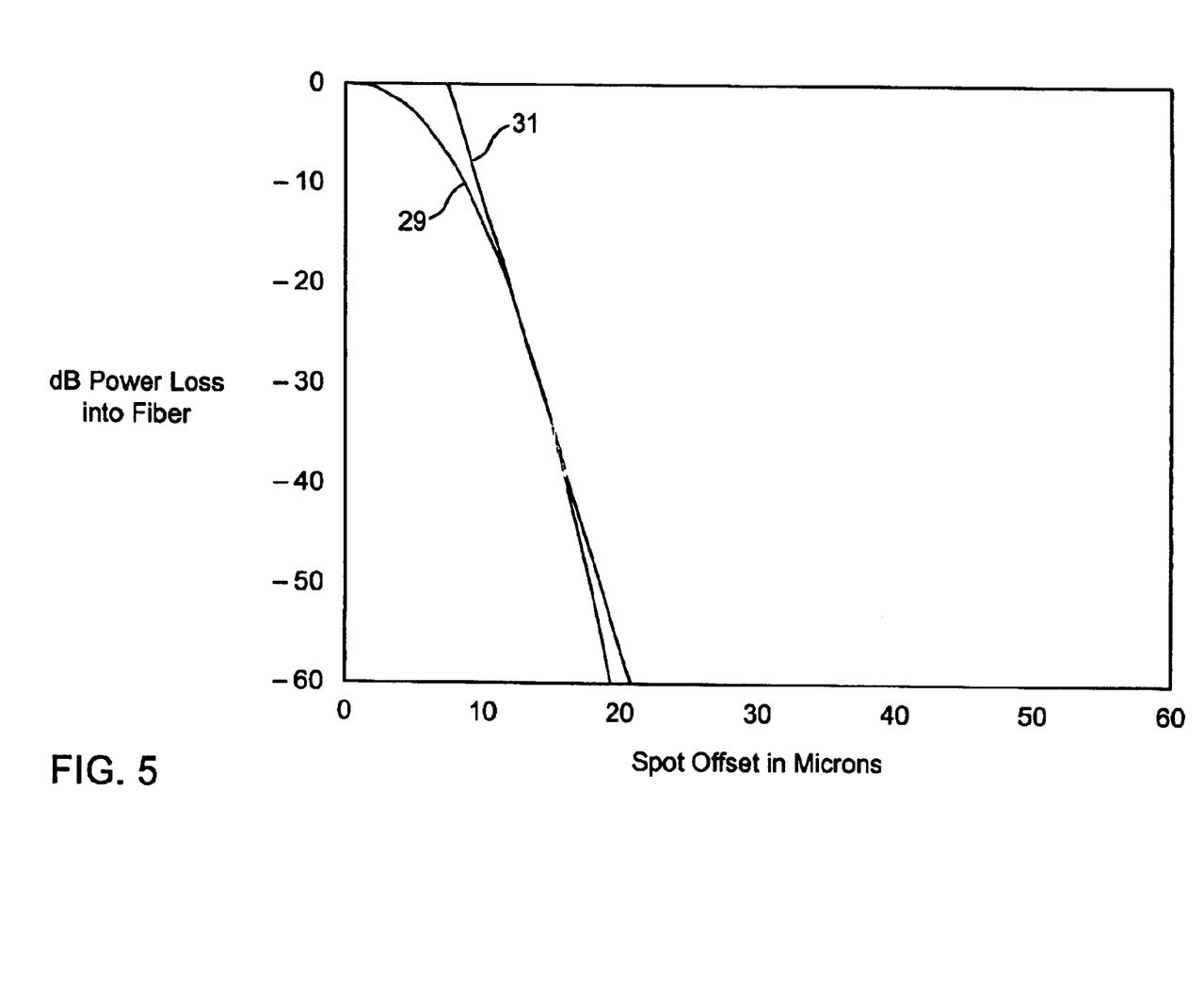
FIG. 5 is a plot showing attenuation of the optical power coupled into an optical fiber versus misalignment of a light beam with respect to the optical fiber in accordance with an embodiment of the present invention.

Referring to FIG. 5, curve 29 is a plot, for one implementation, of the attenuation of the optical power coupled into optical fiber 26 as a function of the offset of the center of light beam 8$a$ at surface 25 from the center of core 26$a$ of optical fiber 26. In this implementation, lens 24 has a focal length of about 4 mm, light beam 8$a$ has a diameter of about 0.8 mm at lens 24, core 26$a$ of optical fiber 26 has a diameter of about 8 $\mu$m, and surface 25 is approximately at the focal plane of lens 24. As curve 29 indicates, an offset of about 18 $\mu$m between the center of the focused beam and the center of optical fiber 26 in this implementation results in an attenuation of about 60 decibels (dB). This offset corresponds to a misalignment of light beam 8$a$ with respect to optical axis 28 (FIGS. 2A–2C) of about 0.25°. Such a misalignment of light beam 8$a$ can be achieved with a misalignment of mirror 12 of about 0.125°, since the angular displacement of light beam 8$a$ is twice that of mirror 12.

In many optical communication applications the maximum optical attenuation required is about 30 dB. The slope of curve 29 at about 30 dB attenuation, represented by line 31, is about 1 dB of attenuation per 0.22 $\mu$m of offset. This corresponds to about 3 dB per 0.01° misalignment of light beam 8$a$ with respect to optical axis 28. Hence, control of the orientation of mirror 12 with a resolution of better than about 0.005° allows control of the attenuation of the power of light coupled into optical fiber 26 with a resolution better than about 3 dB. Such angular resolution may be achieved, for example, in optical fiber cross-connect switches described in U.S. patent application Ser. No. 09/999,878, U.S. patent application Ser. No. 09/999,610, and U.S. patent application Ser. No. 10/002,310 of course, the resolution with which the attenuation is controlled improves as the angular resolution with which the mirror is controlled is improved. Attenuation curves for other implementations are similar to curve 29.

Controlled misalignment of mirror 12 to attenuate light coupled into optical fiber 26 may be accomplished by numerous methods. Referring again to FIG. 1, control system 18 receives electrical signals corresponding to the optical power in light beam 8$b$ (and thus in light beam 8$a$) from photodetector 14 via electrical line 32. Control system 18 determines from these electrical signals the amount by which light beam 8$a$ is to be attenuated. In one embodiment, (optional) conventional fiber coupler 34 directs a portion of the light coupled into optical fiber 26 to (optional) photodetector 36. Photodetector 36, which may be a conventional InGaAs photodiode, provides a signal corresponding to the optical power coupled into optical fiber 26 to control system 18 via electrical line 38. Control system 18 controls the orientation of mirror 12 such that the electrical signals provided by photodetector 36 indicate that the light coupled into optical fiber 26 is attenuated to the desired power level. Hence, in this embodiment control system 18, actuator 16, mirror 12, and photodetector 36 form a feedback loop by which attenuation of the light coupled into optical fiber 26 is controlled.

In another embodiment, a look-up table stored in a computer readable medium (memory 18a) in control system 18 relates the orientation of mirror 12 to the attenuation of the light coupled into optical fiber 26. In this embodiment, control system 18 determines from the electrical signals received from photodetector 14 the amount by which light beam 8a is to be attenuated, reads the required orientation of mirror 12 from the look-up table (which contains information correlating the amount of attenuation to the mirror's orientation), and controls actuator 16 to orient mirror 12 accordingly. The look-up table may be generated by measuring, with photodetectors 14 and 36, for example, the attenuation of light coupled into optical fiber 26 for each of a series of different orientations of mirror 12.

In other embodiments, controlled misalignment of mirror 12 is accomplished using measurements of the position of one or more control light beams separate from the optical signals to be attenuated. In these embodiments, mirror 12 may be controlled, for example, using methods similar or identical to methods for controlling the orientations of mirrors in an optical fiber cross-connect switch disclosed in the following U.S. patent application Ser. No. 09/999,878, U.S. patent application Ser. No. 09/999,610, U.S. patent application Ser. No. 09/999,705, U.S. patent application Ser. No. 10/003,659, and U.S. patent application Ser. No. 10/002,310.

In one implementation, for example, laser 40 (FIG. 1) outputs control light beam 42 incident on dichroic beam splitter 10. In some implementations, the wavelength of control light beam 42 is a wavelength not typically used in telecommunications. In one implementation, for example, laser 40 is a conventional laser diode emitting light having a wavelength of about 660 nm. Dichroic beam splitter 10 reflects light beam 42 to mirror 12, which directs control light beam 42 to dichroic beam splitter 22. Dichroic beam splitter 22 reflects control light beam 42 to position sensing detector 44. Thus, the position at which control light beam 42 is incident on position sensing detector 44 is determined by the orientation of mirror 12. Dichroic beam splitter 22 is, for example, substantially identical to dichroic beam splitter 10. Suitable position sensing detectors are available, for example, from UDT Sensors, Inc. of Hawthorne, Calif. and from Pacific Silicon Sensor, Inc. of Westlake Village, Calif.

Position sensing detector 44 provides a signal indicating the position at which control light beam 42 is incident on it to control system 18 via electrical line 46. A look-up table stored in memory 18a in control system 18 relates the attenuation of the light coupled into optical fiber 26 to the position at which control light beam 42 is incident on position sensing detector 44. In this implementation, control system 18 determines from the electrical signals received from photodetector 14 the amount by which light beam 8a is to be attenuated, determines from the look-up table the corresponding position on position sensing detector 44 to which control light beam 42 is to be directed, and controls the orientation of mirror 12 to direct control light beam 42 to that position. The look-up table used in this implementation may be generated by measuring the attenuation of light coupled into optical fiber 26 and the position at which control light beam 42 is incident on position sensing detector 44 for each of a series of orientations of mirror 12.

Variable optical attenuator 1 of FIG. 1 includes only one mirror (mirror 12) having an orientation controlled by control system 18 in a range of directions (dθ,dφ). The angle of incidence of light beam 8a on surface 25 and the location on surface 25 at which light beam 8a is incident (FIGS. 2A–2C) cannot be independently controlled with this single controlled mirror.

In other embodiments, light beam 8a is directed to optical fiber 26 by two or more mirrors having orientations controlled by controller 18. For example, variable optical attenuator 47 shown in FIG. 3 includes, in addition to the elements shown in FIG. 1, mirror 48 coupled to actuator 50. Actuator 50 is controlled by control system 18 with electrical signals provided via electrical line 52 to orient mirror 48 in a range of arbitrary directions (dθ,dφ). Either or both of mirrors 12 and 48 can be controllably misaligned, by the methods described above, to variably attenuate light coupled into optical fiber 26. The use of two controllable mirrors in the optical path of light beam 8a allows independent control of the angle of incidence of light beam 8a on surface 25 and the location on surface 25 at which light beam 8a is incident. This may result in better control of light coupled into optical fiber 26. In some embodiments, lens 6 focuses light beam 8a to a waist at a location along light beam 8a between mirror 12 and mirror 48. Such focusing can maintain a relatively small diameter of light beam 8a throughout variable optical attenuator 47 and thus reduce uncontrolled optical loss.

Figure 3:
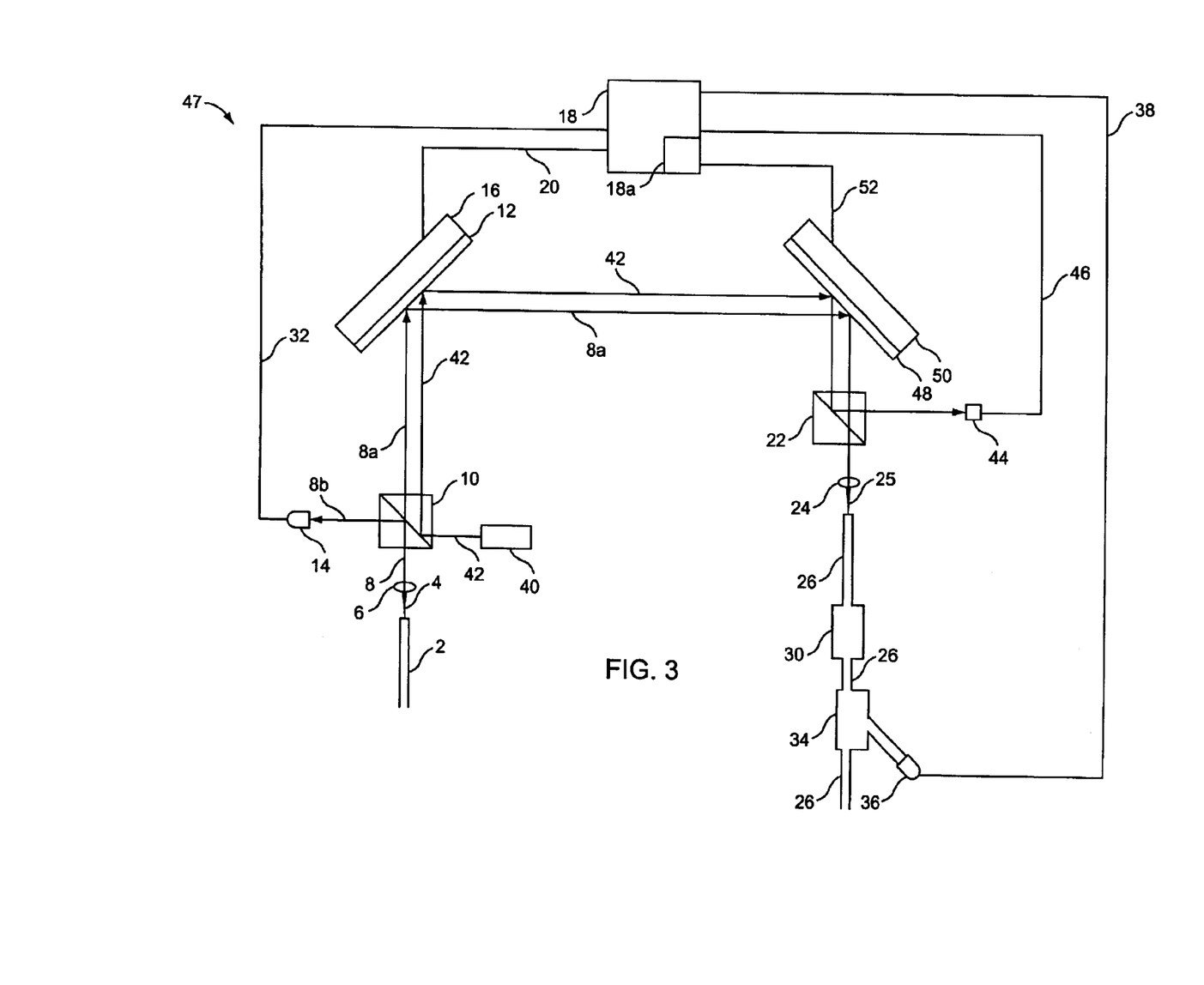
FIG. 3 illustrates schematically a variable optical attenuator in accordance with another embodiment of the present invention.

Variable optical attenuators in accordance with embodiments of the present invention may be implemented within optical fiber cross-connect switches such as those described in U.S. patent application Ser. No. 09/999,878, U.S. patent application Ser. No. 09/999,610, and U.S. patent application Ser. No. 10/002,310. In particular, mirrors 12 and 48 (FIG. 3) may be mirrors in an optical fiber cross-connect switch oriented to couple light from an input port (optical fiber 2) to an output port (optical fiber 26). Although FIGS. 1 and 3 show only a single input optical fiber 2 and a single output optical fiber 26, an optical fiber cross-connect switch within which a variable optical attenuator is implemented in accordance with an embodiment of the present invention typically has a plurality of inputs and a plurality of outputs. In a typical optical path through such a switch, light entering the switch through an input port is incident on a corresponding first micro-mechanical mirror in a first two dimensional array of micro-mechanical mirrors. The first micro-mechanical mirror, which can be oriented in a range of arbitrary directions (dθ,dφ), is tilted to direct the light to a second micro-mechanical mirror in a second two dimensional array of micro-mechanical mirrors. The second micro-mechanical mirror, which can also be oriented in a range of arbitrary directions (dθ,dφ), is tilted to direct the light to a corresponding output port and hence out of the switch.

The light may be switched from the output port to which it is initially directed to another output port by reorienting the first micro-mechanical mirror to direct the light to another (i.e., a third) micro-mechanical mirror in the second array of micro-mirrors, and orienting the third micro-mechanical mirror to direct the light to its corresponding output port. The micro-mechanical mirrors may be optimally aligned to couple a maximum amount of light into an output port, or controllably misaligned to variably attenuate the light coupled into an output port. Advantageously, a variable optical attenuator function can be thereby added to an optical network without the insertion of additional optical elements, as power sensing functions such as those provided by beam splitter 10 and photodetector 14 (FIG. 1) are typically present in such switches for control and monitoring purposes. In this way, light entering the switch at any input port can be directed to any output port with the proper attenuation.

Figure 4:
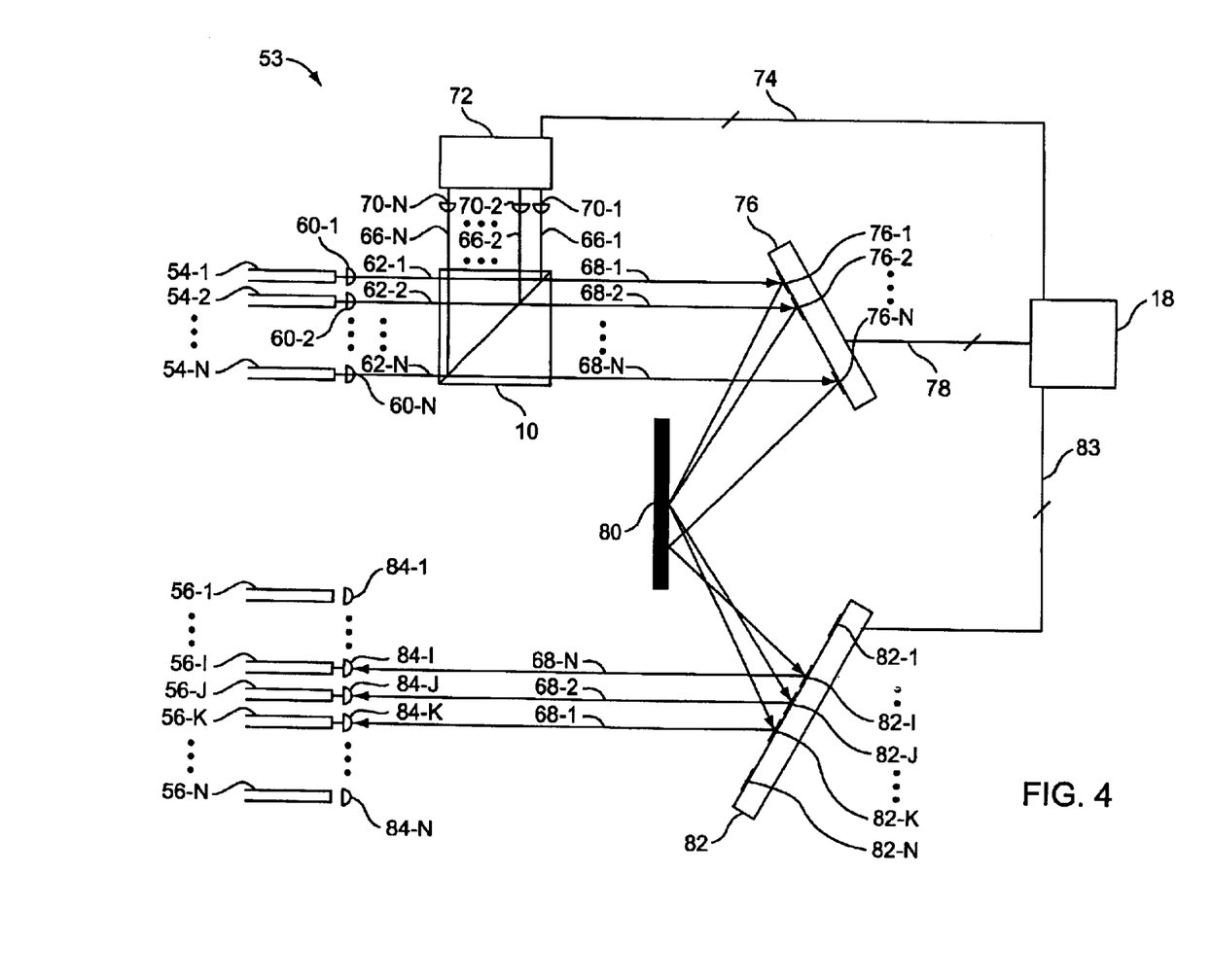
FIG. 4 illustrates schematically an optical fiber cross-connect switch in which is implemented a variable optical attenuator in accordance with an embodiment of the present invention.

Referring to FIG. 4, for example, optical fiber cross-connect switch 53 (substantially similar to those described in U.S. patent application Ser. No. 09/999,878, U.S. patent application Ser. No. 09/999,610, and U.S. patent application U.S. patent application Ser. No. 10/002,310) routes light carried by any one of N input optical fibers 54-1-54-N to any one of N output optical fibers 56-1-56-N and also performs variable optical attenuation functions in accordance with an embodiment of the present invention. In the implementation shown in FIG. 4, the number of input optical fibers equals the number of output optical fibers. Other implementations include N input optical fibers and P output optical fibers, with either N<P or N>P. Typically, both N and P are greater than about 1000. In one implementation, for example, N is about 1200 and P=N.

Optical fibers 54-1-54-N output diverging cones of light which are collimated or weakly focused by, respectively, lenses 60-1-60-N to form, respectively, light beams 62-1-62-N incident on beam splitter 10. Although for convenience of illustration optical fibers 54-1-54-N are shown in FIG. 4 arranged in a single row, typically the ends of optical fibers 54-1-54-N are arranged in a two dimensional array. Lenses 60-1-60-N may be identical to lens 6 of FIG. 1. Alternatively, lenses 60-1-60-N may be lenslets (small lenses) arranged in a two dimensional lenslet array sometimes called a microlens array.

Beam splitter 10 divides light beams 62-1-62-N into light beams 66-1-66-N and light beams 68-1-68-N. Light beams 66-1-66-N are incident on, respectively, lenses 70-1-70-N which focus them onto separate spots on input sensor 72. Input sensor 72 detects the intensity of each of light beams 66-1-66-N and provides corresponding electrical signals to control system 18 via bus 74. Input sensor 72 is, for example, a SU128-1.7RT infrared camera having a 128×128 pixel array available from Sensors Unlimited, Inc. of Princeton, N.J.

Light beams 68-1-68-N are incident on, respectively, micro mirrors 76-1-76-N of micro mirror array 76. Typically, micro mirrors 76-1-76-N are arranged in a two dimensional array corresponding to that of lenses 60-1-60-N and optical fibers 54-1-54-N. In some implementations the pitch of micro mirrors 76-1-76-N in a direction along mirror array 76 parallel to the planes of incidence of light beams 68-1-68-N (defined by light beams 68-1-68-N and axes normal to mirror array 76 at the points at which the light beams intersect mirror array 76) is elongated compared to the corresponding pitch of lenses 60-1-60-N such that light beams 68-1-68-N are incident approximately centered on micro mirrors 76-1-76-N. The orientations of micro mirrors 76-1-76-N are individually controllable over a range of arbitrary angles (dθ,dφ) by control system 18 with electrical signals transmitted via bus 78. Micro mirror array 76 is, for example, a MEMS micro mirror array described in U.S. patent application Ser. No. 09/779,189.

In the illustrated embodiment, micro mirrors 76-1-76-N reflect light beams 68-1-68-N, respectively, onto fold mirror 80. Fold mirror 80 reflects light beams 68-1-68-N onto micro mirror array 82. Micro mirror array 82 includes N micro mirrors 82-1-82-N. The orientations of micro mirrors 82-1-82-N are individually controllable over a range of arbitrary angles (dθ,dφ) by control system 18 with electrical signals transmitted via bus 83. In one implementation, micro mirror arrays 76 and 82 are substantially identical.

In the illustrated embodiment each of micro mirrors 76-1-76-N is controllable to reflect a light beam incident on it from the corresponding one of optical fibers 54-1-54-N to any one of micro mirrors 82-1-82-N via fold mirror 80. Hence, control system 18 can control the orientations of micro mirrors 76-1-76-N to reflect, via fold mirror 80, any one of light beams 68-1-68-N onto the approximate center of any one of micro mirrors 82-1-82-N. For example, FIG. 4 shows light beams 68-1, 68-2, and 68-N reflected to, respectively, micro mirrors 82-K, 82-J, and 82-I. Micro mirrors 82-I, 82-J, and 82-K, which need not be adjacent to one another, may be any of micro mirrors 82-1-82-N. In other embodiments micro mirrors 76-1-76-N are controllable to reflect light beams 68-1-68-N to any one of micro mirrors 8-1-82-N without the use of a fold mirror such as fold mirror 80. In some such embodiments, for example, micro mirrors 76-1-76-N may reflect light beams 68-1-68-N directly to any one of micro mirrors 82-1-82-N.

Control system 18 controls the orientations of micro mirrors 82-1-82-N to reflect the light beams incident on them from micro mirror array 76 to, respectively, lenses 84-1-84-N. FIG. 4 shows micro mirrors 82-I, 82-J, and 82-K reflecting, respectively, light beams 68-N, 68-2, and 68-1 to, respectively, lenses 84-I, 84-J, and 84-K. It should be understood, however, that each particular one of micro mirrors 82-1-82-N is controlled to reflect whichever one of light beams 68-1-68-N is incident on it to the lens 84-1-84-N corresponding to that particular micro mirror. For example, micro mirror 82-1 is controlled to reflect whichever one of light beams 68-1-68-N is incident on it to lens 84-1.

Lenses 84-1-84-N focus light beams reflected by, respectively, micro mirrors 82-1-82-N onto, respectively, optical fibers 56-1-56-N. Lenses 84-1-84-N may be, for example, substantially identical to lenses 60-1-60-N.

Control system 18 determines from the electrical signals provided by input sensor 72 the amount by which light beams 60-1-60-N must be attenuated, and controls the orientation of micro mirrors 76-1-76-N and 82-1-82-N by, for example, the methods disclosed above (e.g., using control light beams and position sensing detectors) to variably attenuate and/or switch the light beams between output optical fibers 56-1-56-N.

In one embodiment, variable attenuation functions of optical cross-connect switch 53 are used to substantially equalize (load balance) the power levels of M Dense Wavelength Division Multiplexing wavelength channels on a single optical fiber, where M≤N (N the number of input ports). The wavelength channels are demultiplexed from the optical fiber with a conventional optical demultiplexer, and each coupled onto a separate one of M of the input optical fibers 54-1-54-N.

Control system 18 determines the power levels of the M wavelength channels from the electrical signals it receives from input sensor 72, and controls mirror arrays 76 and 82 to route each of the M light beams corresponding to the various wavelength channels to a separate one of M of the output optical fibers 56-1-56-N. The lowest power wavelength channel is routed to its corresponding output optical fiber with, for example, approximately minimal attenuation. The power levels of the other wavelength channels are attenuated, for example, to approximately that of the lowest power wavelength channel by controllably misaligning the micro mirrors of mirror arrays 76 and 82 as described above. A conventional optical multiplexer coupled to the M output optical fibers then multiplexes the wavelength channels onto a single optical fiber.

While the present invention is illustrated with particular embodiments, the invention is intended to include all variations and modifications falling within the scope of the appended claims.

We claim:

1. A variable optical attenuator comprising:
   a first port;
   a second port;
   a mirror located to direct light output by said first port to said second port;
   a controller coupled to said mirror to align said mirror such that a predetermined fraction of light output by said first port is coupled into said second port, wherein said predetermined fraction is less than a maximum fraction corresponding to optimal coupling of said light into said second port;
   a laser coupled to output a control light beam;
   a first beam splitter coupled to reflect the control light beam to the mirror;
   a second beam splitter coupled to receive the control light beam from the mirror and to reflect the control light beam to a position sensing detector; and
   a position sensing detector coupled to receive the control light beam and to couple a signal indicating a position at which the control light beam is incident on the position sensing detector to the controller.

2. The variable optical attenuator of claim 1, wherein said first port and said second port include optical fibers.

3. The variable optical attenuator of claim 1, wherein said first port is one of a first plurality of ports and said second port is one of a second plurality of ports.

4. The variable optical attenuator of claim 1, wherein said mirror is included in an optical cross-connect switch.

5. The variable optical attenuator of claim 1, wherein said controller controls an orientation of said mirror with an angular resolution better than about 0.0050°.

6. The variable optical attenuator of claim 1, further comprising a third beam splitter located to divide said light output by said first port into at least two portions, and a detector located to detect one of said portions.

7. The variable optical attenuator of claim 1, further comprising a detector coupled to said second port to detect at least a portion of light coupled into said second port.

8. The variable optical attenuator of claim 1, wherein raid mirror is a first mirror, further comprising a second mirror located to direct to said second port light output by said first port and reflected by said first mirror.

9. The variable optical attenuator of claim 8, wherein said controller is coupled to said second mirror to align said second mirror such that said predetermined fraction of light output by said first port is coupled into said second port.

* * * * *